US012694837B1

(12) United States Patent
Yan et al.

(10) Patent No.: US 12,694,837 B1
(45) Date of Patent: Jul. 28, 2026

(54) DISPLAY DEVICE

(71) Applicant: Guangzhou China Star Optoelectronics Semiconductor Display Technology Co., Ltd., Guangzhou (CN)

(72) Inventors: Xiaolin Yan, Guangzhou (CN); Jun Zhao, Guangzhou (CN); Bin Zhao, Guangzhou (CN); Weiran Cao, Guangzhou (CN); Zhihui Cai, Guangzhou (CN); Kai He, Guangzhou (CN); Yuhua Dong, Guangzhou (CN); Shimin Ge, Guangzhou (CN); Shan Li, Guangzhou (CN); Xiaoqi Li, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/241,554

(22) Filed: Jun. 18, 2025

(30) Foreign Application Priority Data

Jan. 24, 2025 (CN) ........................ 202510122928.5

(51) Int. Cl.
*G09G 3/3266* (2016.01)

(52) U.S. Cl.
CPC ..... *G09G 3/3266* (2013.01); *G09G 2300/043* (2013.01); *G09G 2300/0819* (2013.01)

(58) Field of Classification Search
CPC ........... G09G 3/3266; G09G 2300/043; G09G 2300/0819
See application file for complete search history.

(56) References Cited

U.S. PATENT DOCUMENTS

2016/0042691 A1* 2/2016 Na ........................ G11C 19/28 345/82
2023/0077438 A1* 3/2023 Ohara .................. G09G 3/3291 345/549
2023/0097004 A1* 3/2023 Yu ........................ G09G 3/3291 345/204

FOREIGN PATENT DOCUMENTS

CN 220856079 U 4/2024
CN 118430437 A 8/2024
WO 2020062027 A1 4/2020

OTHER PUBLICATIONS

Chinese Office Action issued in corresponding Chinese Patent Application No. 202510122928.5 dated Sep. 6, 2025, pp. 1-7.

* cited by examiner

*Primary Examiner* — Lisa S Landis
(74) *Attorney, Agent, or Firm* — PV IP PC; Christopher S. Ruprecht; Wei Te Chung

(57) ABSTRACT

The present disclosure provides a display device including a display panel. The display panel includes driving circuits in a plurality of cascaded stages, each of the driving circuits includes a gate driving signal sub-circuit, an initialization signal sub-circuit, and a reference signal sub-circuit. The gate driving signal sub-circuit, the initialization signal sub-circuit, and the reference signal sub-circuit each includes a plurality of oxide semiconductor transistors. A bottom gate of the oxide semiconductor transistor which is prone to negative bias effect is electrically connected to a potential control signal input terminal.

11 Claims, 5 Drawing Sheets

DISPLAY DEVICE

CROSS-REFERENCE TO RELATED APPLICATION

This application claims priority to Chinese Patent Application No. 202510122928.5, filed on Jan. 24, 2025. The disclosure of the aforementioned application is incorporated herein by reference in its entirety.

TECHNICAL FIELD

The present disclosure relates to the field of display technologies, and in particular, to a display device.

BACKGROUND

In organic electro-luminescence display panels (OLED), in order to ensure precise control of light emission of each pixel and avoid uneven light emission, an internal compensation circuit is required. Because the internal compensation circuit requires high characteristics of thin film transistor (TFT) elements, low temperature poly-silicon (LTPS) is generally used as a semiconductor material of TFT elements.

However, the production cost of LTPS TFT elements is high, which leads to the high cost of display panels employing the LTPS TFT elements. In contrast, the production cost of oxide semiconductor TFT elements is relatively low, but the device characteristics and stability of the of oxide semiconductor TFT elements are not as good as those of LTPS TFT elements, and it is difficult to achieve high mobility and high stability characteristics at the same time.

In order to solve the above problems, traditional organic electro-luminescence display panels adopt a hybrid process: an indium gallium zinc oxide (IGZO) material with good stability but low mobility is used in a pixel circuit to meet the needs of internal compensation of the pixel circuit; and a high mobility oxide material is used in gate-driver on array (GOA) circuits to improve circuit driving capabilities and meet high refresh rate requirements. However, in order to realize the internal compensation function of pixels and meet the requirements of narrow frame, driving circuits in the traditional organic electro-luminescence display panels need to provide at least three sets of driving sub-circuits to output at least three sets of signals to the pixels. This requires the driving sub-circuit to adopt a simplified circuit architecture. Since the high mobility oxide material is prone to negative bias effect, the organic electroluminescent display panel adopting the simplified circuit architecture has a high risk when lighting up and a trustworthiness risk.

SUMMARY

Embodiments of the present disclosure provide a display device including a display panel. The display panel includes driving circuits in a plurality of cascaded stages, and each of the driving circuits includes a gate driving signal sub-circuit, an initialization signal sub-circuit, and a reference signal sub-circuit. The gate driving signal sub-circuit, the initialization signal sub-circuit, and the reference signal sub-circuit each include a plurality of oxide semiconductor transistors. A bottom gate of each of at least a part of the oxide semiconductor transistor in the gate driving signal sub-circuit is electrically connected to a potential control signal input terminal, a bottom gate of each of at least a part of the initialization signal sub-circuit is electrically connected to the potential control signal input terminal, and a bottom gate of each of at least a part of the oxide semiconductor transistor in the reference signal sub-circuit is electrically connected to the potential control signal input terminal.

DETAILED DESCRIPTION

Hereinafter, specific embodiments of the present disclosure will be described in detail with reference to the accompanying drawings.

The terms "first", "second", and similar words do not indicate any order, quantity, or importance, but are merely used to distinguish different technical features. The term "a plurality of" and similar words refer to two or more unless explicitly defined otherwise.

Embodiments of the present disclosure may be combined with one another.

The display device provided in the embodiments of the present disclosure may be, for example, an OLED display device, a Mini-LED display device, or a Micro-LED display device, and the embodiments of the present disclosure will be described with the OLED display device as an example.

Figure 1:
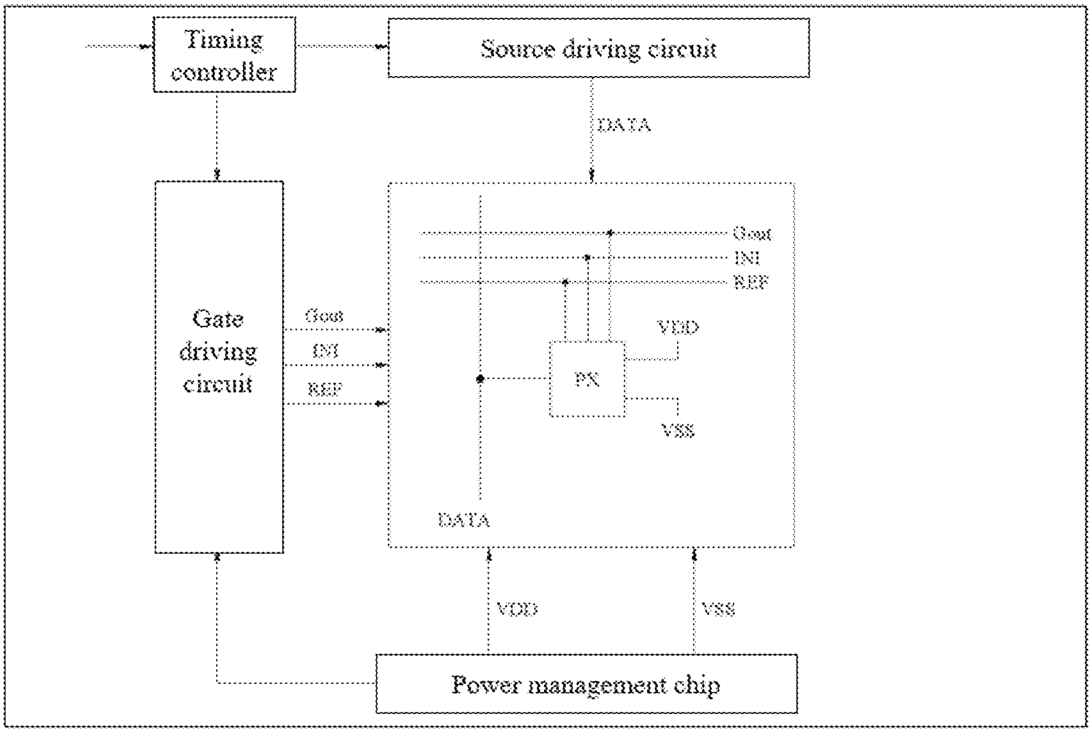
FIG. 1 is a schematic diagram of a display device according to embodiments of the present disclosure.

As illustrated in FIG. 1, the display device provided by the embodiments of the present disclosure includes a display panel, a timing controller, a source driving circuit, and a power management chip (the power management chip may be integrated with the timing controller into the same chip). The display panel is an organic light-emitting diode (OLED) display panel.

The display panel includes a display area and a non-display area. The display area is provided with m×n pixel units PX arranged in an array, where m and n are integers greater than 1. The non-display area is located at a periphery of the display area and is configured for arranging driving circuits and various signal lines. The display panel further includes a plurality of gate driving signal lines Gout[n], a plurality of initialization signal lines INI[n], a plurality of reference signal lines REF[n], a plurality of date lines DATA, and a gate driving circuit. The plurality of gate driving signal lines Gout[n], the plurality of initialization signal lines INI[n], and the plurality of reference signal lines REF[n] extend in a first direction and are arranged in a second direction. The plurality of data lines DATA extend in the second direction and are arranged in the first direction. The first direction is perpendicular to the second direction. The gate driving circuit is provided in the non-display area, and is electrically connected to the plurality of gate driving signal lines Gout[n], the plurality of initialization signal lines INI[n], and the plurality of reference signal lines REF[n]. The source driving circuit is electrically connected to the plurality of data lines DATA through a flexible circuit board. The timing controller is electrically connected with the gate driving circuit and the source driving circuit.

The display panel includes an organic light-emitting diode array substrate and an encapsulation layer. The organic light-emitting diode array substrate includes a base substrate, a buffer layer disposed on the base substrate, an active layer disposed on the buffer layer, a gate insulating layer disposed on the active layer, a first metal layer disposed on the gate insulating layer, an interlayer insulating layer disposed on the first metal layer, a second metal layer disposed on the interlayer insulating layer, a planarization layer disposed on the second metal layer, a first electrode layer disposed on the planarization layer, a pixel defining layer disposed on the first electrode layer, an organic light-emitting layer disposed in opening areas defined by the pixel defining layer, and a second electrode layer disposed on the organic light-emitting layer. The first metal layer includes the gate driving signal lines Gout[n], the initialization signal lines INI[n], the reference signal lines REF[n], gates, and the like. The second metal layer includes the data lines DATA, sources, drains, and the like. The encapsulation layer is hermetically connected to the organic light-emitting diode array substrate to prevent moisture and oxygen from entering the organic light-emitting layer.

Each pixel unit PX includes a pixel driving circuit and an organic light-emitting diode OLED (light-emitting device). The pixel driving circuit includes at least two thin film transistors and a storage capacitor. One of the two thin film transistors is a switching transistor, a gate of the switching transistor is electrically connected to a corresponding scanning line, and a source of the switching transistor is electrically connected to a corresponding data line. The other one of the two thin film transistors serves as a driving transistor, a gate of the driving transistor is electrically connected to a drain of the switching transistor, a source of the driving transistor is electrically connected to a first power supply voltage line, and a drain of the driving transistor is electrically connected to an anode of the organic light-emitting diode OLED. One end of the storage capacitor is electrically connected to a gate of the driving transistor, and the other end of the storage capacitor is electrically connected to the source or the drain of the driving transistor. A cathode of the organic light-emitting diode OLED is electrically connected to a second power supply voltage line.

The gate driving circuit includes gate driving units in n cascaded stages, and each stage of gate driving unit is electrically connected to one scanning line. Under the control of the timing controller, the gate driving units sequentially output scanning signals to scan each row of pixel units PX in the display area line by line. The source driving circuit generates and outputs data signals according to image data under the control of the timing controller. The timing controller is configured to receive and process externally input image data and timing signals, generate control signals, and transmit the image data to the source driving circuit. The power management chip is configured to provide operating voltages to various parts of the display device, including providing a second power supply voltage VSS to the cathode of the organic light-emitting diode OLED, providing a first power supply voltage VDD to the first power supply voltage line, providing a gate driving voltage VGH/VGL to the gate driving circuit, and the like.

The present disclosure provides a display device including the display panel including a plurality of cascaded driving circuits. In order to drive a pixel circuit with a 4T1C structure in the display panel, the driving circuit needs to output a gate driving signal Gout[n], an initialization signal INI[n], and a reference signal REF[n] to the pixel circuit with the 4T1C structure. To this end, the driving circuit includes a gate driving signal sub-circuit (illustrated in FIG. 2), an initialization signal sub-circuit (illustrated in FIG. 3), and a reference signal sub-circuit (illustrated in FIG. 4).

The pixel circuit with the 4T1C structure includes a driving transistor, a switching transistor, an initialization transistor, a compensation transistor, and a storage capacitor. A gate of the driving transistor is electrically connected to a first plate of the storage capacitor, a source of the driving transistor is electrically connected to the first power supply voltage line VDD, and a drain of the driving transistor is electrically connected to the anode of the organic light-emitting diode OLED. A gate of the switching transistor is electrically connected to a gate driving signal input terminal Gout[n], a source of the switching transistor is electrically connected to a corresponding one of the data lines DATA, and a drain of the switching transistor is electrically connected to a gate of the driving transistor. A gate of the initialization transistor is electrically connected to an initialization signal input terminal INI[n], a source of the initialization transistor is electrically connected to an initialization voltage terminal, and a drain of the initialization transistor is electrically connected to the anode of the organic light-emitting diode OLED. A gate of the compensation transistor is electrically connected to a reference signal input terminal REF[n], a source of the compensation transistor is electrically connected to a reference voltage input terminal, and a drain of the compensation transistor is electrically connected to the gate of the driving transistor. A second plate of the storage capacitor is electrically connected to the drain of the driving transistor. The cathode of the organic light-emitting diode OLED is electrically connected to the second power supply voltage line VSS. The above-described pixel circuit with the 4T1C structure does not use a light emission control signal to control the light emission of the organic light-emitting diode OLED, but realizes the ON/OFF of a current path of the organic light-emitting diode OLED by controlling the ON/OFF of the driving transistors.

In order to meet the narrow bezel requirements of the display panel, both the gate driving signal sub-circuit and the initialization signal sub-circuit adopt a minimalist circuit architecture of 10T1C (10 transistors and 1 capacitor), and the reference signal sub-circuit adopts a minimalist circuit architecture of 10T2C (10 transistors and 2 capacitors). These three sub-circuits need to input fourteen signals, including eight clock signals CK, two high-level power signals VGH, two low-level power signals VGL, one start signal STV, and one vertical synchronization signal VST.

In order to meet the driving capability requirements and realize the miniaturization of transistor size, the transistors in these sub-circuits are all top-gate transistors, and their semiconductor layers are made of high mobility oxide materials. The high-mobility oxide material refers to a material having a higher mobility than that of an indium gallium zinc oxide (IGZO) material. Specifically, the high mobility oxide material may be selected from an In—Sn—O (ITO) material, an In—W—O (IWO) material, an In—Zn—W—O (IZWO) material, and an In—Ti—O (ITiO) material. By employing the high mobility oxide material as the semiconductor layer, it is possible to meet the driving capability requirements and realize the miniaturization of transistor size.

However, high-mobility oxide materials are prone to negative bias effects, which leads to a high risk of failure in traditional minimalist circuit architectures. Specifically, in the gate driving signal sub-circuit and the initialization signal sub-circuit, the transistors T42_1, TrQ_1, and T41_1 and the transistors T42_2, TrQ_2, and T41_2 are prone to negative bias effects; and in the reference signal sub-circuit, the transistors T41_3, T51_3, T51A_3, and T42_3 are also prone to negative bias effects. The negative bias effects of these transistors may cause threshold voltages (Vth) to decrease, so that the transistors cannot be fully cut off when they should, thus affecting the normal operation of the display panel.

In order to solve the problem, in the present disclosure, the bottom gates of these transistors, which are prone to negative bias effects, are electrically connected to a potential control signal input terminal LS.

Figure 5:
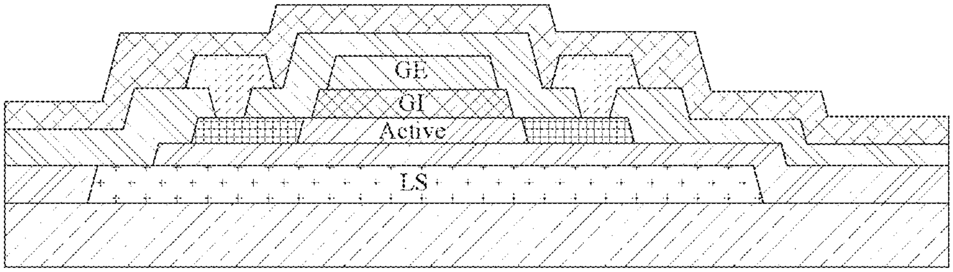
FIG. 5 is a schematic diagram of some transistors of a gate driving signal sub-circuit, an initialization signal sub-circuit, and a reference signal sub-circuit of a display device according to embodiments of the present disclosure.

Specifically, as illustrated in FIG. 5, each transistor includes a top gate GE, a source, and a drain. The top gate GE is located above a semiconductor layer Active, and a gate insulating layer GI is provided between the top gate GE and the semiconductor layer. Each of the transistors prone to the negative bias effects in these sub-circuits further includes a bottom gate LS, and the bottom gate LS is located below the semiconductor layer Active. The bottom gate LS is constituted by a light shielding layer (Light Shield) which not only has a light shielding function, but also serves as a bottom gate (second gate) of a transistor.

Figure 6:
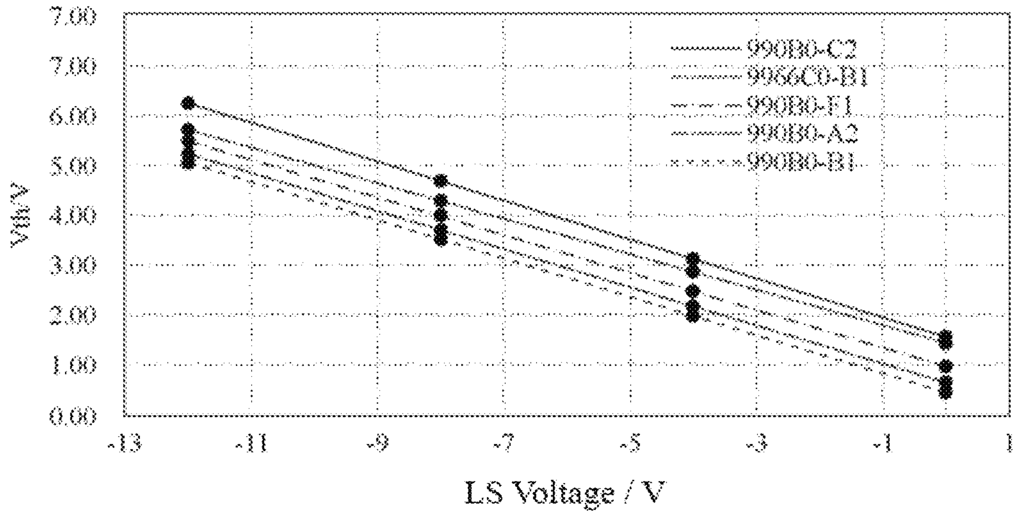
FIG. 6 is a schematic diagram showing a trend of a threshold voltage of a high mobility oxide transistor at different bottom gate voltages.

As illustrated in FIG. 6, which shows a trend of the threshold voltage (Vth) of the high mobility oxide transistor at different LS (light shielding layer, which acts as a bottom gate of a transistor) voltages. On the premise of ensuring that the product frame is not affected, by adjusting a voltage of the bottom gate of the high mobility oxide transistor with the top gate structure, the threshold voltage of these transistors that are prone to negative bias effect can be adjusted so that it is within the adjustment range (Vth Margin) of the threshold voltage of the transistors. This figure contains the test data of five different test points (990B0-C2, 996C0-B1, 990B0-A2, 990B0-B1, and 990B0-F1). The abscissa represents the LS voltage, which ranges from −11 volts to 0 volts; and the ordinate represents the threshold voltage Vth, which ranges from 0 volts to 8 volts. Through experimental research, it is found that when the potential control signal input terminal LS is applied with a negative voltage not greater than −5 volts, the negative bias effect of these transistors can be effectively prevented. The experimental data show that there is a good linear relationship between the threshold voltage of the transistor and a potential control signal when an input range of the potential control signal is from −12 volts to 2 volts, and a correlation coefficient $R^2$ reaches 0.999.

Specifically, at these five different test points, as the LS voltage increases from −12 volts to 0 volts, the threshold voltage Vth of the transistor shows a linear falling trend. When the LS voltage is −12 volts, the threshold voltage Vth of each test point is between 5.0 volts and 6.2 volts. When the LS voltage is 0 volts, the threshold voltage Vth at each test point drops to between 0.5 volts and 1.5 volts. There is a linear relationship of y=ax+b between the threshold voltage Vth and the LS voltage at all test points, where a represents a slope, and b represents an intercept. This consistent linear change trend confirms that the threshold voltage Vth of high mobility oxide transistors can be effectively controlled by adjusting the LS voltage.

Figure 7:
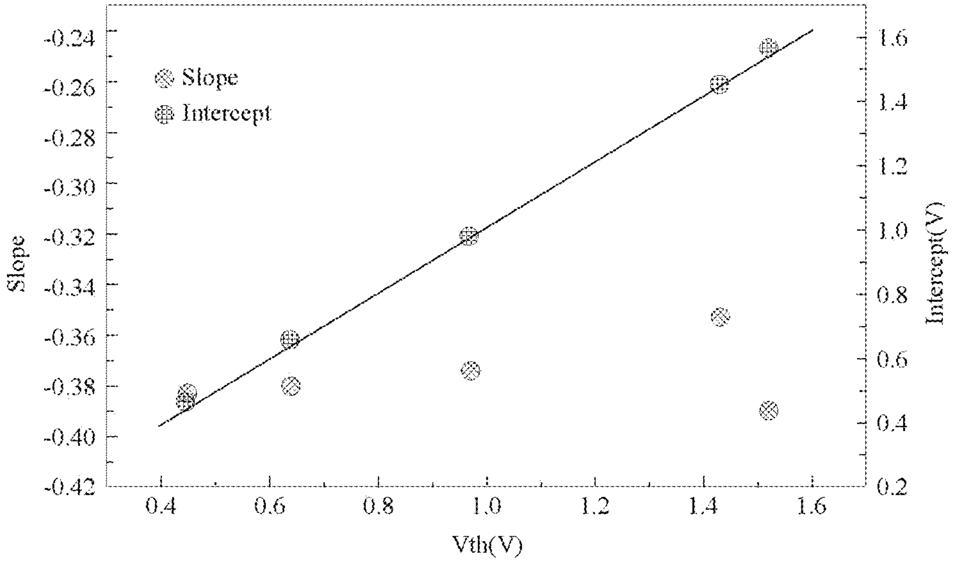
FIG. 7 is a schematic diagram showing dependence of a slope a and an intercept b on a threshold voltage in a relationship curve y=ax+b of the threshold voltage versus a bottom gate voltage.

As illustrated in FIG. 7, which shows the dependence of the slope a and the intercept b on the threshold voltage in the Vth-LS voltage relationship curve y=ax+b. The figure contains two sets of data: each dot in one set represents the slope, and each dot in the other set represents the intercept. The abscissa represents the threshold voltage Vth, which ranges from 0.4 volts to 1.6 volts. The left ordinate represents the slope, which ranges from −0.42 to −0.24. The right ordinate represents the intercept, which ranges from 0.2 volts to 1.6 volts. Further research shows that the slope a of different test points is similar, fluctuating between −0.40 and −0.35, indicating that the response characteristics of different points to the LS voltage are similar. The intercept b shows a good linear correlation with the threshold voltage Vth (that is, the threshold voltage when the LS voltage is 0 volts), and the correlation coefficient $R^2$ reaches 0.99. This means that a desired value of the LS voltage can be predicted by measuring the threshold voltage Vth, thereby accurately controlling the threshold voltage Vth of the transistors. For example, when the threshold voltage Vth=0 volts, the threshold voltage Vth can be adjusted above 1.5 volts by negatively biasing the LS voltage by −4 volts. Furthermore, after the threshold voltage Vth of the high mobility oxide transistor is adjusted by negatively biasing the LS voltage, the positive bias stability (ΔVth) has not deteriorated significantly and is basically at the same level, indicating that a trustworthiness risk of this proposal to the driving circuit is low.

More importantly, the proposal of the present disclosure, which prevents the negative bias effect by controlling the bottom gate voltage, does not affect the positive bias stability of the transistor.

TABLE 1

| | LS = 0 V | | LS = −4 V | | LS = −8 V | |
|---|---|---|---|---|---|---|
| Items | Vth-lin | Vth-sat | Vth-lin | Vth-sat | Vth-lin | Vth-sat |
| 0 seconds | 1.71 | 1.75 | 2.36 | 2.31 | 3.90 | 3.93 |
| 3600 seconds | 3.14 | 3.04 | 3.75 | 3.25 | 5.13 | 5.02 |
| Δ Vth | 1.43 | 1.29 | 1.39 | 0.94 | 1.29 | 1.09 |

Table 1 shows the trend data of the positive bias stability (ΔVth) under different LS voltages. In Table 1 above, the threshold voltage changes of transistors in a linear region (Vth-lin) and a saturation region (Vth-sat) are tested respectively under three voltage conditions: LS=0 volts, LS=−4 volts, and LS=−8 volts. Vth-lin refers to the threshold voltage measured when the transistor operates in the linear region (i.e., the interval where the voltage VDS between the drain and the source is small and a drain current ID has a linear relationship with VDS), Vth-sat refers to the threshold voltage measured when the transistor operates in the saturation region (i.e., the voltage VDS between the drain and the source is large and the drain current ID tends to saturate as VDS increases).

Experimental data shows that at 0 seconds, as the LS voltage increases (changing from 0 volts to −8 volts), the threshold voltage Vth of the transistor shows a rising trend. For example, in the linear region, the threshold voltage Vth is 1.71 volts at LS=0 volts, rises to 2.36 volts at LS=−4 volts, and further rises to 3.90 volts at LS=−8 volts. This trend also shows a similar regularity in the saturation region.

After 3600 seconds of positive bias stress test, the threshold voltage Vth is increased under each condition, but ΔVth (that is, the difference between the threshold voltage Vth at 3600 seconds and the threshold voltage Vth at 0 seconds) does not deteriorate as the LS voltage increases. Specifically, in the linear region, when LS=0 volts, ΔVth is 1.43 volts; when LS=−4 volts, ΔVth is 1.39 volts; and when LS=−8 volts, ΔVth is 1.29 volts. In the saturation region, when LS=0 volts, ΔVth is 1.29 volts; when LS=−4 volts, ΔVth is 0.94 volts; and when LS=−8 volts, ΔVth is 1.09 volts. This result is in sharp contrast to a phenomenon that the higher the LS voltage and the more likely the Vth is to deteriorate in the traditional technical proposals, which confirms that the technical proposals proposed in the present disclosure do not affect the stability of the device while adjusting the threshold voltage Vth.

Based on the above research results, this application provides the following technical proposals.

The gate driving signal sub-circuit, the initialization signal sub-circuit, and the reference signal sub-circuit each includes a plurality of oxide semiconductor transistors. The bottom gates of at least part of the oxide semiconductor transistors in the gate driving signal sub-circuit are electrically connected to the potential control signal input terminal LS, the bottom gates of at least part of the oxide semiconductor transistors in the initialization signal sub-circuit are electrically connected to the potential control signal input terminal LS, and the bottom gates of at least part of the oxide semiconductor transistors in the reference signal sub-circuit are electrically connected to the potential control signal input terminal LS.

A voltage value of a signal input to the potential control signal input terminal LS is not greater than −5 volts.

Figure 2:
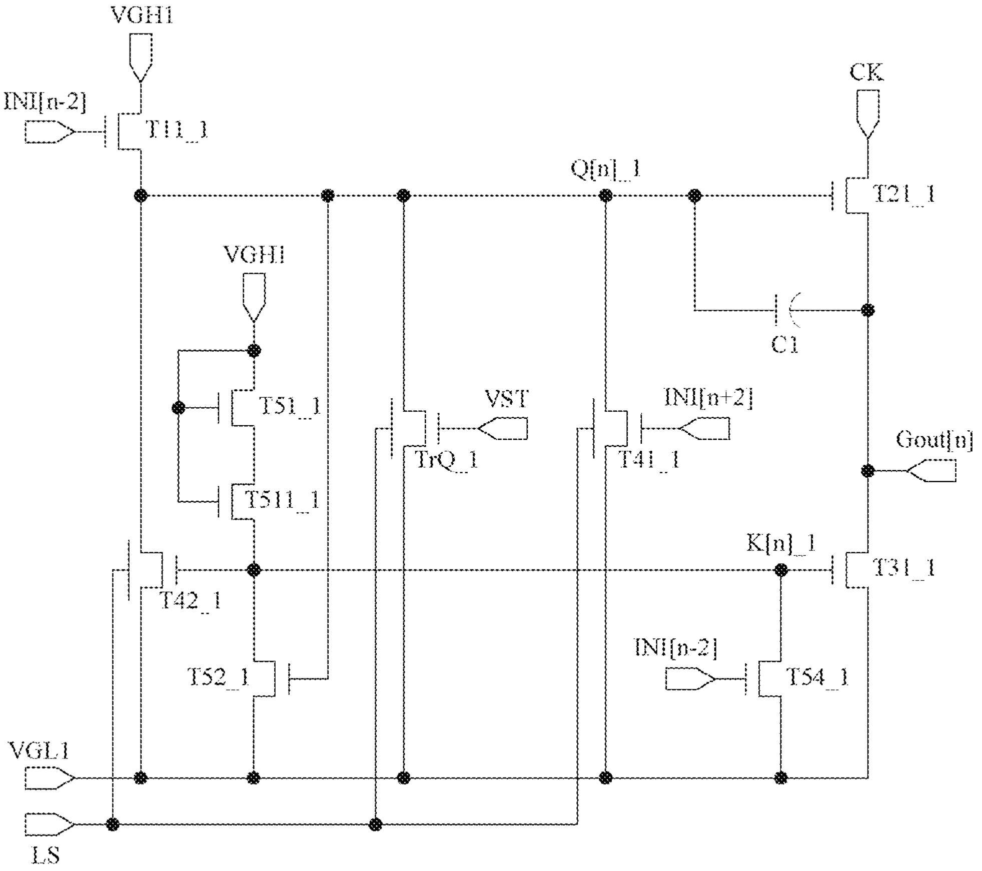
FIG. 2 is a circuit diagram of a gate driving signal sub-circuit of a display device according to embodiments of the present disclosure.
Figure 3:
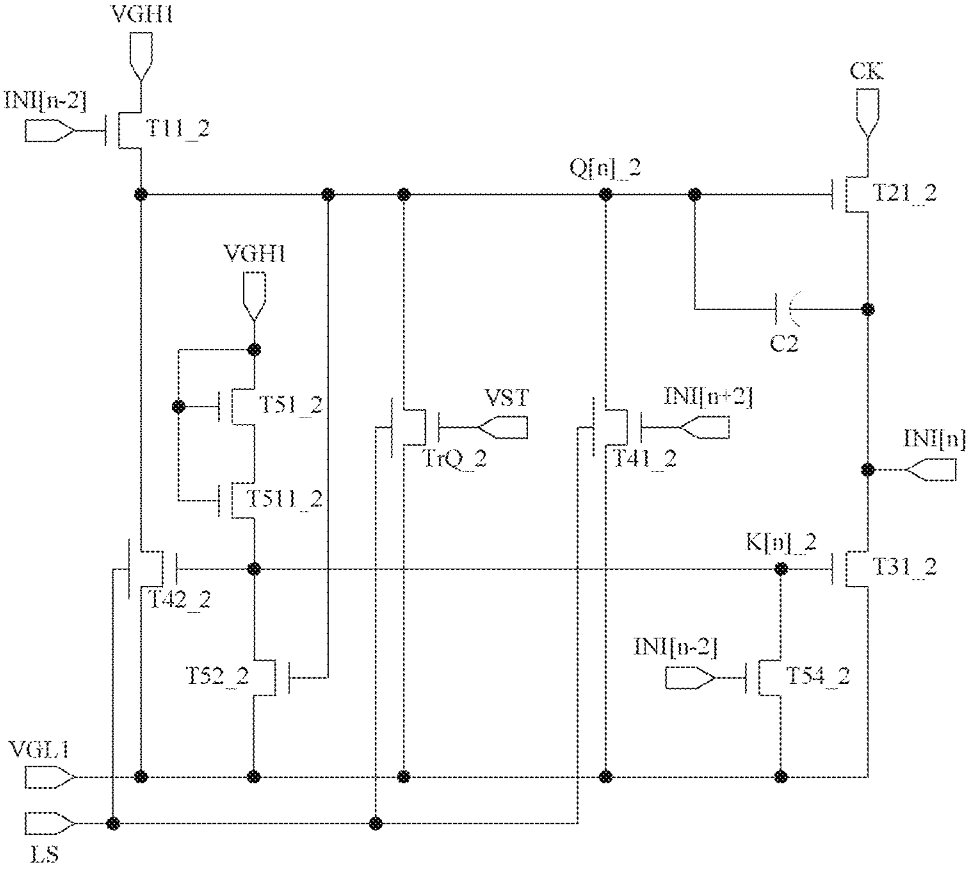
FIG. 3 is a circuit diagram of an initialization signal sub-circuit of a display device according to embodiments of the present disclosure.

As illustrated in FIG. 2, the gate driving signal sub-circuit includes first to tenth transistors and a first capacitor C1. The bottom gates of at least three oxide semiconductor transistors in the gate driving signal sub-circuit are electrically connected to the potential control signal input terminal LS. Specifically, bottom gates of a first transistor T41_1, a second transistor TrQ_1, and a third transistor T42_1 are electrically connected to the potential control signal input terminal LS. Specifically, the gate driving signal sub-circuit includes the first transistor T41_1, the second transistor TrQ_1, and the third transistor T42_1. A top gate of the first transistor T41_1 is electrically connected to a subsequent-stage initialization signal input terminal INI[n+2], a drain of the first transistor T41_1 is electrically connected to a first node Q[n]_1, a source of the first transistor T41_1 is electrically connected to a first low-level power signal input terminal VGL1, and a bottom gate of the first transistor T41_1 is electrically connected to the potential control signal input terminal LS. A top gate of the second transistor TrQ_1 is electrically connected to a start signal input terminal VST, a drain of the second transistor TrQ_1 is electrically connected to the first node Q[n]_1, a source of the second transistor TrQ_1 is electrically connected to the first low-level power signal input terminal VGL1, and a bottom gate of the second transistor TrQ_1 is electrically connected to the potential control signal input terminal LS. A source of the third transistor T42_1 is electrically connected to the first low-level power signal input terminal VGL1, a drain of the third transistor T42_1 is electrically connected to the first node Q[n]_1, a top gate of the third transistor T42_1 is electrically connected to a second node K[n]_1, and a bottom gate of the third transistor T42_1 is electrically connected to the potential control signal input terminal LS.

These three transistors constitute a pull-down unit for pulling the first node Q[n]_1 down to a low-level when the gate drive signal output needs to be turned off. By applying a negative voltage to the bottom gates of these transistors, threshold voltage Vth of these transistors can be prevented from decreasing (increasing the threshold voltage), ensuring that these transistors can be fully cut off when turned off.

The gate driving signal sub-circuit further includes a fourth transistor T11_1, a fifth transistor T21_1, a sixth transistor T31_1, a seventh transistor T51_1, an eighth transistor T511_1, a ninth transistor T52_1, a tenth transistor T54_1, and a first capacitor C1.

A top gate of the fourth transistor T11_1 is electrically connected to a preceding-stage initialization signal INI[n−2], a source of the fourth transistor T11_1 is electrically connected to a first high-level power signal input terminal VGH1, a drain of the fourth transistor T11_1 is electrically connected to the first node Q[n]_1, and the fourth transistor T11_1 is configured to transmit the first high-level power signal VGH1 to the first node Q[n]_1 under the control of the preceding-stage initialization signal INI[n−2]. A source of the fifth transistor T21_1 is electrically connected to a clock signal input terminal CK, a top gate of the fifth transistor T21_1 is electrically connected to the first node Q[n]_1, a drain of the fifth transistor T21_1 is electrically connected to a gate driving signal output terminal Gout[n], and the fifth transistor T21_1 is configured to transmit the clock signal CK to the gate driving signal output terminal Gout[n] under the control of the first node Q[n]_1. A top gate of the sixth transistor T31_1 is electrically connected to a second node K[n]_1, a source of the sixth transistor T31_1 is electrically connected to the first low-level power signal input terminal VGL1, a drain of the sixth transistor T31_1 is electrically connected to the gate driving signal output terminal Gout[n], and the sixth transistor T31_1 is configured to transmit the first low-level power signal VGL1 to the gate driving signal output terminal Gout[n] under the control of the second node K[n]_1. The seventh transistor T51_1 and the eighth transistor T511_1 constitute a double transistor structure. A top gate and a source of the seventh transistor T51_1 are electrically connected to the first high-level power signal input terminal VGH1, a top gate of the eighth transistor T511_1 is electrically connected to the first high-level power signal input terminal VGH1, a source of the eighth transistor T511_1 is electrically connected to a drain of the seventh transistor T51_1, a drain of the eighth transistor T511_1 is electrically connected to the second node K[n]_1, and the seventh transistor T51_1 and the eighth transistor T511_1 are configured to control a level of the second node K[n]_1. A top gate of the ninth transistor T52_1 is electrically connected to the first node Q[n]_1, a drain of the ninth transistor T52_1 is electrically connected to the second node K[n]_1, and a source of the ninth transistor T52_1 is electrically connected to the first low-level power signal input terminal VGL1. A top gate of the tenth transistor T54_1 is electrically connected to the preceding-stage initialization signal INI[n−2], a drain of the tenth transistor T54_1 is electrically connected to the second node K[n]_1, and a source of the tenth transistor T54_1 is electrically connected to the first low-level power signal input terminal VGL1. The ninth transistor T52_1 and the tenth transistor T54_1 are configured to pull the second node K[n]_1 down to a low-level at a specific instant. A first plate of the first capacitor C1 is electrically connected to the first node Q[n]_1, a second plate of the first capacitor C1 is electrically connected to the gate driving signal output terminal Gout[n], and the first capacitor C1 is configured to maintain the level of the first node Q[n]_1.

Figure 4:
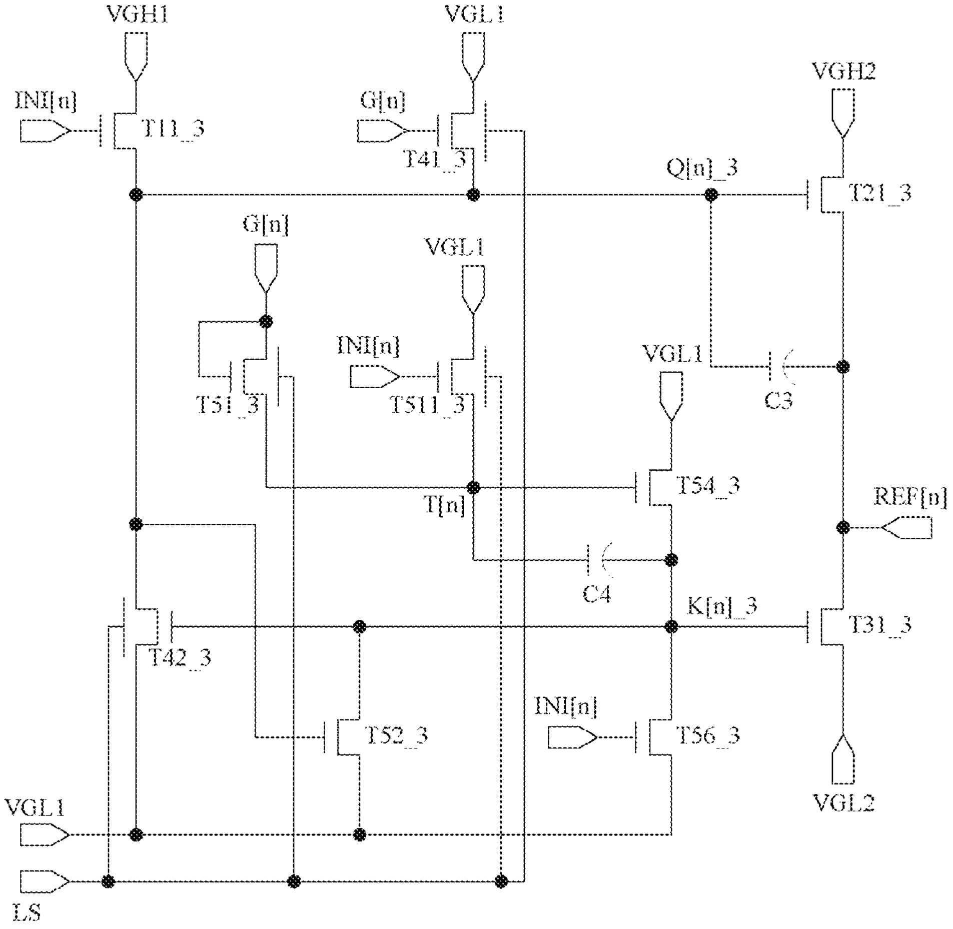
FIG. 4 is a circuit diagram of a reference signal sub-circuit of a display device according to embodiments of the present disclosure.

As illustrated in FIG. 4, the initialization signal sub-circuit includes an eleventh transistors T41_2 to a twentieth transistors T54_2 and a second capacitor C2, and bottom gates of at least three oxide semiconductor transistors in the initialization signal sub-circuit are electrically connected to the potential control signal input terminal LS. Specifically, bottom gates of the eleventh transistor T41_2, a twelfth transistor TQ_2, and a thirteenth transistor T42_2 are electrically connected to the potential control signal input terminal LS. These three transistors also constitute a pull-down unit, which is controlled by bottom gate voltages to prevent negative bias effects.

Specifically, the initialization signal sub-circuit includes an eleventh transistor T41_2, a twelfth transistor TrQ_2, a thirteenth transistor T42_2, a fourteenth transistor T11_2, a fifteenth transistor T21_2, a sixteenth transistor T31_2, a seventeenth transistor T51_2, an eighteenth transistor T511_2, a nineteenth transistor T52_2, a twentieth transistor T54_2, and a second capacitor C2. A top gate of the eleventh transistor T41_2 is electrically connected to a subsequent-stage initialization signal input terminal INI[n+2], a drain of the eleventh transistor T41_2 is electrically connected to a third node Q[n]_2, a source of the eleventh transistor T41_2 is electrically connected to the first low-level power signal input terminal VGL1, and a bottom gate of the eleventh transistor T41_2 is electrically connected to the potential control signal input terminal LS. A top gate of the twelfth transistor TrQ_2 is electrically connected to the start signal input terminal VST, a drain of the twelfth transistor TrQ_2 is electrically connected to the third node Q[n]_2, a source of the twelfth transistor TrQ_2 is electrically connected to the first low-level power signal input terminal VGL1, and a bottom gate of the twelfth transistor TrQ_2 is electrically connected to the potential control signal input terminal LS. A source of the thirteenth transistor T42_2 is electrically connected to the first low-level power signal input terminal VGL1, a top gate of the thirteenth transistor T42_2 is electrically connected to a fourth node K[n]_2, a drain of the thirteenth transistor T42_2 is electrically connected to the third node Q[n]_2, and a bottom gate of the thirteenth transistor T42_2 is electrically connected to the potential control signal input terminal LS.

A top gate of the fourteenth transistor T11_2 is electrically connected to the preceding-stage initialization signal input terminal INI[n−2], a source of the fourteenth transistor T11_2 is electrically connected to the high-level power signal input terminal VGH, and a drain of the fourteenth transistor T11_2 is electrically connected to the third node Q[n]_2. A source of the fifteenth transistor T21_2 is electrically connected to the clock signal input terminal CK, a top gate of the fifteenth transistor T21_2 is electrically connected to the third node Q[n]_2, and a drain of the fifteenth transistor T21_2 is electrically connected to an initialization signal output terminal INI[n]. A top gate of the sixteenth transistor T31_2 is electrically connected to the fourth node K[n]_2, a source of the sixteenth transistor T31_2 is electrically connected to the first low-level power signal input terminal VGL1, and a drain of the sixteenth transistor T31_2 is electrically connected to the initialization signal output terminal INI[n]. A top gate and a source of the seventeenth transistor T51_2 are electrically connected to the high-level power signal input terminal VGH. A top gate of the eighteenth transistor T511_2 is electrically connected to the high-level power signal input terminal VGH, a source of the eighteenth transistor T511_2 is electrically connected to a drain of the seventeenth transistor T51_2, and a drain of the eighteenth transistor T511_2 is electrically connected to the fourth node K[n]_2. A top gate of the nineteenth transistor T52_2 is electrically connected to the third node Q[n]_2, a drain of the nineteenth transistor T52_2 is electrically connected to the fourth node K[n]_2, and a source of the nineteenth transistor T52_2 is electrically connected to the first low-level power signal input terminal VGL1. A top gate of the twentieth transistor T54_2 is electrically connected to the preceding-stage initialization signal input terminal INI[n−2], a drain of the twentieth transistor T54_2 is electrically connected to the fourth node K[n]_2, and a source of the twentieth transistor T54_2 is electrically connected to the first low-level power signal input terminal VGL1. A first plate of the second capacitor C2 is electrically connected to the third node Q[n]-2, and a second plate of the second capacitor C2 is electrically connected to the initialization signal output terminal INI[n].

As illustrated in FIG. 4, the reference signal sub-circuit includes a twenty-first transistor T41_3 to a thirtieth transistor T56_3 and third and fourth capacitors C3 and C4, and bottom gates of at least four oxide semiconductor transistors in the reference signal sub-circuit are electrically connected to the potential control signal input terminal LS. Specifically, bottom gates of a twenty-first transistor T41_3, a twenty-second transistor T51_3, a twenty-third transistor T51A_3, and a twenty-fourth transistor T42_3 are electrically connected to the potential control signal input terminal LS. These four transistors also prevent negative bias effects by controlling the bottom gate voltages. The reference signal sub-circuit adopts a 10T2C structure. Specifically, the reference signal sub-circuit includes a twenty-first transistor T41_3, a twenty-second transistor T51_3, a twenty-third transistor T51A_3, a twenty-fourth transistor T42_3, a twenty-fifth transistor T11_3, a twenty-sixth transistor T21_3, a twenty-seventh transistor T31_3, a twenty-eighth transistor T52_3, a twenty-ninth transistor T54_3, a thirtieth transistor T56_3, a third capacitor C3, and a fourth capacitor C4. A top gate of the twenty-first transistor T41_3 is electrically connected to a current-stage gate driving signal output terminal Gout[n], a source of the twenty-first transistor T41_3 is electrically connected to the first low-level power signal input terminal VGL1, a drain of the twenty-first transistor T41_3 is electrically connected to a fifth node Q[n]_3, and a bottom gate of the twenty-first transistor T41_3 is electrically connected to the potential control signal input terminal LS. A top gate of the twenty-second transistor T51_3 is electrically connected to the current-stage gate driving signal output terminal Gout[n], a drain of the twenty-second transistor T51_3 is electrically connected to a seventh node T[n], a source of the twenty-second transistor T51_3 is electrically connected to the current-stage gate driving signal output terminal Gout[n], and a bottom gate of the twenty-second transistor T51_3 is electrically connected to the potential control signal input terminal LS. A top gate of the twenty-third transistor T51A_3 is electrically connected to a current-stage initialization signal input terminal INI[n], a drain of the twenty-third transistor T51A_3 is electrically connected to the seventh node T[n], a source of the twenty-third transistor T51A_3 is electrically connected to the first low-level power signal input terminal VGL1, and a bottom gate of the twenty-third transistor T51A_3 is electrically connected to the potential control signal input terminal LS. A source of the twenty-fourth transistor T42_3 is electrically connected to the first low-level power signal input terminal VGL1, a drain of the twenty-fourth transistor T42_3 is electrically connected to the fifth node Q[n]_3, a top gate of the twenty-fourth transistor T42_3 is electrically connected to a sixth node K[n]_3, and a bottom gate of the twenty-fourth transistor T42_3 is electrically connected to the potential control signal input terminal LS. A top gate of the twenty-fifth transistor T11_3 is electrically connected to the current-stage initialization signal input terminal INI[n], a source of the twenty-fifth transistor T11_3 is electrically connected to the high-level power signal input terminal VGH, and a drain of the twenty-fifth transistor T11_3 is electrically connected to the fifth node Q[n]_3. A source of the twenty-sixth transistor T21_3 is electrically connected to a second high-level power signal input terminal VGH2, a top gate of the twenty-sixth transistor T21_3 is electrically connected to the fifth node Q[n]_3, and a drain of the twenty-sixth transistor T21_3 is electrically connected to a reference signal output terminal REF[n]. A top gate of the twenty-seventh transistor T31_3 is electrically connected to the sixth node K[n]_3, a source of the twenty-seventh transistor T31_3 is electrically connected to a second low-level power signal input terminal VGL2, and a drain of the twenty-seventh transistor T31_3 is electrically connected to the reference signal output terminal REF[n]. A drain of the twenty-eighth transistor T52_3 is electrically connected to the sixth node K[n]_3, a source of the twenty-eighth transistor T52_3 is electrically connected to the first low-level power signal input terminal VGL1, and a top gate of the twenty-eighth transistor T52_3 is electrically connected to the fifth node Q[n]_3. A source of the twenty-ninth transistor T54_3 is electrically connected to the high-level power signal input terminal VGH, a drain of the twenty-ninth transistor T54_3 is electrically connected to the sixth node K[n]_3, and a top gate of the twenty-ninth transistor T54_3 is electrically connected to the seventh node T[n]. A top gate of the thirtieth transistor T56_3 is electrically connected to the current-stage initialization signal input terminal INI[n], a source of the thirtieth transistor T56_3 is electrically connected to the first low-level power signal input terminal VGL1, and a drain of the thirtieth transistor T56_3 is electrically connected to the sixth node K[n]_3. A first plate of the third capacitor C3 is electrically connected to the fifth node Q[n]_3, and a second plate of the third capacitor C3 is electrically connected to the reference signal output terminal REF[n]. A first plate of the fourth capacitor C4 is electrically connected to the sixth node K[n]-3, and a second plate of the fourth capacitor C4 is electrically connected to the seventh node T[n].

Through the improved technical proposals, the present disclosure can optimize the adjustment range (Vth Margin) of the threshold voltage from the original range of 0.5 volts to 5.4 volts to the range of −2.2 volts to 5.4 volts, significantly broadening the adjustable range of the threshold voltage. This optimization enables the driving circuit to better adapt to the characteristics of high mobility oxide transistors, greatly improving the feasibility of the circuit. More importantly, the improvement does not significantly increase a width of frame of the display panel, maintaining the narrow bezel characteristics of the product.

In particular implementation, the voltage at the potential control signal input terminal LS is not greater than −5 volts, and preferably may be adjusted in a range of −12 volts to −5 volts. For example, specific voltage values that may be selected include, but are not limited to: −12 volts, −11 volts, −10 volts, −9 volts, −8 volts, −7 volts, −6 volts, and −5 volts. By adjusting the voltage at the potential control signal input terminal LS, the threshold voltage of each transistor can be accurately controlled, thus ensuring the normal operation of the driving circuit.

The experimental data show that when the voltage at the potential control signal input terminal LS is −4 volts, the threshold voltage of the transistors can be adjusted to greater than 1.5 volts, which is enough to prevent the negative bias effects. At the same time, at this voltage value, the positive bias stability (Vth) of the transistors does not deteriorate significantly. For example, in the linear region, when LS=0 volts, ΔVth is 1.43 volts; when LS=−4 volts, ΔVth is 1.39 volts; and when LS=−8 volts, ΔVth is 1.29 volts. In the saturation region, when LS=0 volts, ΔVth is 1.29 volts; when LS=−4 volts, ΔVth is 0.94 volts; and when LS=−8 volts, ΔVth is 1.09 volts. This shows that the technical proposals proposed in the present disclosure can not only effectively prevent the negative bias effect, but also not affect the positive bias stability of the transistors, thereby ensuring the reliability and stability of the display device.

Through the above technical proposals, the display device provided by the present disclosure successfully solves the technical problem that the simplified driving circuit in the prior arts is prone to negative bias effect. The proposals can not only effectively prevent the negative bias effect, but also not affect the positive bias stability of the transistors, and at the same time maintain the narrow bezel characteristics of the display device. The proposals are particularly suitable for OLED display panels that require narrow bezel design.

The embodiments of the present disclosure have been described in detail above, and the contents of the present specification should not be construed as limiting the scope of protection of the present disclosure.

What is claimed is:

1. A display device, comprising a display panel, the display panel comprising driving circuits in a plurality of cascaded stages, each of the driving circuits comprising a gate driving signal sub-circuit, an initialization signal sub-circuit, and a reference signal sub-circuit;

wherein the gate driving signal sub-circuit, the initialization signal sub-circuit, and the reference signal sub-circuit each comprises a plurality of oxide semiconductor transistors, a bottom gate of each of at least a part of the oxide semiconductor transistors in the gate driving signal sub-circuit is electrically connected to a potential control signal input terminal, a bottom gate of each of at least a part of the oxide semiconductor transistors in the initialization signal sub-circuit is electrically connected to the potential control signal input terminal, and a bottom gate of each of at least a part of the oxide semiconductor transistors in the reference signal sub-circuit is electrically connected to the potential control signal input terminal.

2. The display device according to claim 1, wherein bottom gates of at least three of the oxide semiconductor transistors in the gate driving signal sub-circuit are electrically connected to the potential control signal input terminal.

3. The display device according to claim 1, wherein the gate driving signal sub-circuit comprises:

a first transistor, wherein a top gate of the first transistor is electrically connected to a subsequent-stage initialization signal input terminal, a drain of the first transistor is electrically connected to a first node, a source of the first transistor is electrically connected to a first low-level power signal input terminal, and a bottom gate of the first transistor is electrically connected to the potential control signal input terminal;

a second transistor, wherein a top gate of the second transistor is electrically connected to a start signal input terminal, a drain of the second transistor is electrically connected to the first node, a source of the second transistor is electrically connected to the first low-level power signal input terminal, and a bottom gate of the second transistor is electrically connected to the potential control signal input terminal; and a third transistor, wherein a source of the third transistor is electrically connected to the first low-level power signal input terminal, a drain of the third transistor is electrically connected to the first node, a top gate of the third transistor is electrically connected to a second node, and a bottom gate of the third transistor is electrically connected to the potential control signal input terminal.

4. The display device according to claim 3, wherein the gate driving signal sub-circuit further comprises:

a fourth transistor, wherein a top gate of the fourth transistor is electrically connected to a preceding-stage initialization signal input terminal, a source of the fourth transistor is electrically connected to a high-level power signal input terminal, and a drain of the fourth transistor is electrically connected to the first node;

a fifth transistor, wherein a source of the fifth transistor is electrically connected to a clock signal input terminal, a top gate of the fifth transistor is electrically connected to the first node, and a drain of the fifth transistor is electrically connected to a gate driving signal output terminal;

a sixth transistor, wherein a top gate of the sixth transistor is electrically connected to the second node, a source of the sixth transistor is electrically connected to the first low-level power signal input terminal, and a drain of the sixth transistor is electrically connected to the gate driving signal output terminal;

a seventh transistor, wherein a top gate and a source of the seventh transistor are both electrically connected to the high-level power signal input terminal;

an eighth transistor, wherein a top gate of the eighth transistor is electrically connected to the high-level power signal input terminal, a source of the eighth transistor is electrically connected to a drain of the seventh transistor, and a drain of the eighth transistor is electrically connected to the second node;

a ninth transistor, wherein a top gate of the ninth transistor is electrically connected to the first node, a drain of the ninth transistor is electrically connected to the second node, and a source of the ninth transistor is electrically connected to the first low-level power signal input terminal;

a tenth transistor, wherein a top gate of the tenth transistor is electrically connected to the preceding-stage initialization signal input terminal, a drain of the tenth transistor is electrically connected to the second node, and a source of the tenth transistor is electrically connected to the first low-level power signal input terminal; and a first capacitor, wherein a first plate of the first capacitor is electrically connected to the first node, and a second plate of the first capacitor is electrically connected to the gate driving signal output terminal.

5. The display device according to claim 1, wherein bottom gates of at least three of the oxide semiconductor transistors in the initialization signal sub-circuit are electrically connected to the potential control signal input terminal.

6. The display device according to claim 1, wherein the initialization signal sub-circuit comprises:

an eleventh transistor, wherein a top gate of the eleventh transistor is electrically connected to a subsequent-stage initialization signal input terminal, a drain of the eleventh transistor is electrically connected to a third node, a source of the eleventh transistor is electrically connected to a first low-level power signal input terminal, and a bottom gate of the eleventh transistor is electrically connected to the potential control signal input terminal;

a twelfth transistor, wherein a top gate of the twelfth transistor is electrically connected to a start signal input terminal, a drain of the twelfth transistor is electrically connected to the third node, a source of the twelfth transistor is electrically connected to the first low-level power signal input terminal, and a bottom gate of the twelfth transistor is electrically connected to the potential control signal input terminal; and a thirteenth transistor, wherein a source of the thirteenth transistor is electrically connected to the first low-level power signal input terminal, a top gate of the thirteenth transistor is electrically connected to a fourth node, a drain of the thirteenth transistor is electrically connected to the third node, and a bottom gate of the thirteenth transistor is electrically connected to the potential control signal input terminal.

7. The display device of claim 6, wherein the initialization signal sub-circuit further comprises:

a fourteenth transistor, wherein a top gate of the fourteenth transistor is electrically connected to the preceding-stage initialization signal input terminal, a source of the fourteenth transistor is electrically connected to a high-level power signal input terminal, and a drain of the fourteenth transistor is electrically connected to the third node;

a fifteenth transistor, wherein a source of the fifteenth transistor is electrically connected to a clock signal input terminal, a top gate of the fifteenth transistor is electrically connected to the third node, and a drain of the fifteenth transistor is electrically connected to an initialization signal output terminal;

a sixteenth transistor, wherein a top gate of the sixteenth transistor is electrically connected to the fourth node, a source of the sixteenth transistor is electrically connected to the first low-level power signal input terminal, and a drain of the sixteenth transistor is electrically connected to the initialization signal output terminal;

a seventeenth transistor, wherein a top gate and a source of the seventeenth transistor are both electrically connected to the high-level power signal input terminal;

an eighteenth transistor, wherein a top gate of the eighteenth transistor is electrically connected to the high-level power signal input terminal, a source of the eighteenth transistor is electrically connected to a drain of the seventeenth transistor, and a drain of the eighteenth transistor is electrically connected to the fourth node;

a nineteenth transistor, wherein a top gate of the nineteenth transistor is electrically connected to the third node, a drain of the nineteenth transistor is electrically connected to the fourth node, and a source of the nineteenth transistor is electrically connected to the first low-level power signal input terminal;

a twentieth transistor, wherein a top gate of the twentieth transistor is electrically connected to the preceding-stage initialization signal input terminal, a drain of the twentieth transistor is electrically connected to the fourth node, and a source of the twentieth transistor is electrically connected to the first low-level power signal input terminal; and a second capacitor, wherein a first plate of the second capacitor is electrically connected to the third node, and a second plate of the second capacitor is electrically connected to the initialization signal output terminal.

8. The display device according to claim 1, wherein bottom gates of at least four of the oxide semiconductor transistors in the reference signal sub-circuit are electrically connected to the potential control signal input terminal.

9. The display device according to claim 1, wherein the reference signal sub-circuit comprises:

a twenty-first transistor, wherein a top gate of the twenty-first transistor is electrically connected to a current-stage gate driving signal output terminal, a source of the twenty-first transistor is electrically connected to a first low-level power signal input terminal, a drain of the twenty-first transistor is electrically connected to a fifth node, and a bottom gate of the twenty-first transistor is electrically connected to the potential control signal input terminal;

a twenty-second transistor, wherein a top gate of the twenty-second transistor is electrically connected to the current-stage gate driving signal output terminal, a drain of the twenty-second transistor is electrically connected to a seventh node, a source of the twenty-second transistor is electrically connected to the current-stage gate driving signal output terminal, and a bottom gate of the twenty-second transistor is electrically connected to the potential control signal input terminal;

a twenty-third transistor, wherein a top gate of the twenty-third transistor is electrically connected to a current-stage initialization signal input terminal, a drain of the twenty-third transistor is electrically connected to the seventh node, a source of the twenty-third transistor is electrically connected to the first low-level power signal input terminal, and a bottom gate of the twenty-third transistor is electrically connected to the potential control signal input terminal; and a twenty-fourth transistor, wherein a source of the twenty-fourth transistor is electrically connected to the first low-level power signal input terminal, a drain of the twenty-fourth transistor is electrically connected to the fifth node, a top gate of the twenty-fourth transistor is electrically connected to the sixth node, and a bottom gate of the twenty-fourth transistor is electrically connected to the potential control signal input terminal.

10. The display device of claim 9, wherein the reference signal sub-circuit further comprises:

a twenty-fifth transistor, wherein a top gate of the twenty-fifth transistor is electrically connected to the current-stage initialization signal input terminal, a source of the twenty-fifth transistor is electrically connected to a high-level power signal input terminal, and a drain of the twenty-fifth transistor is electrically connected to the fifth node;

a twenty-sixth transistor, wherein a source of the twenty-sixth transistor is electrically connected to a second high-level power signal input terminal, a top gate of the twenty-sixth transistor is electrically connected to the fifth node, and a drain of the twenty-sixth transistor is electrically connected to a reference signal output terminal;

a twenty-seventh transistor, wherein a top gate of the twenty-seventh transistor is electrically connected to the sixth node, a source of the twenty-seventh transistor is electrically connected to a second low-level power signal input terminal, and a drain of the twenty-seventh transistor is electrically connected to the reference signal output terminal;

a twenty-eighth transistor, wherein a drain of the twenty-eighth transistor is electrically connected to the sixth node, a source of the twenty-eighth transistor is electrically connected to the first low-level power signal input, and a top gate of the twenty-eighth transistor is electrically connected to the fifth node;

a twenty-ninth transistor, wherein a source of the twenty-ninth transistor is electrically connected to the high-level power signal input terminal, the drain of the twenty-ninth transistor is electrically connected to the sixth node, and the top gate of the twenty-ninth transistor is electrically connected to the seventh node;

a thirtieth transistor, wherein a top gate of the thirtieth transistor is electrically connected to the current-stage initialization signal input terminal, a source of the thirtieth transistor is electrically connected to the first low-level power signal input terminal, and a drain of the thirtieth transistor is electrically connected to the sixth node;

a third capacitor, wherein a first plate of the third capacitor is electrically connected to the fifth node, and a second plate of the third capacitor is electrically connected to the reference signal output terminal; and a fourth capacitor, wherein a first plate of the fourth capacitor is electrically connected to the sixth node, and a second plate of the fourth capacitor is electrically connected to the seventh node.

11. The display device according to claim 1, wherein a voltage value of a signal input to the potential control signal input terminal is not greater than −5 volts.

* * * * *